3,398,632
PROCESS FOR ANALYZING THE CHEMICAL COMPOSITION OF SOLID MATERIAL USING A HIGH TEMPERATURE ILLUMINATING FLARE
Wayne A. Proell, Seymour, Ind., assignor to Standard Oil Company, Chicago, Ill., a corporation of Indiana
No Drawing. Original application Nov. 24, 1964, Ser. No. 413,647. Divided and this application Mar. 31, 1966, Ser. No. 558,179
1 Claim. (Cl. 88—14)

ABSTRACT OF THE DISCLOSURE

Novel process for analyzing the chemical composition of solid materials using a high temperature illuminating flare comprising chlorine trifluoride and a finely divided metal having a high heat of formation with chlorine and fluorine.

---

This is a division of application Ser. No. 413,647, filed Nov. 24, 1964.

This invention relates to a pyrotechnic suitable for use as a high temperature illuminating flare and more particularly to a pyrotechnic which can be ignited by impact energy and produces high temperature and high light output, characteristics which make it attractive for use as a signalling flare, aerial reconnaissance bomb for photographic purposes, and the like.

An additional and unusual use for the pyrotechnic is in the spectro analysis of the chemical composition of solid material in remote areas. Because of the unusual composition of the pyrotechnic and the high temperature of its flare, the pyrotechnic produces a light signal with spectra characteristic of the composition such as oxygen, carbon, iron, etc., of the adjoining solid material, which light signal is of sufficient output to be seen from great distances. One remote area for exploration by this use is the lunar surface.

My invention is particularly directed to a pyrotechnic ignitable by impact and suitable for use in generating high temperature light signals which will permit the identication of many of the components of a surface by spectroscopic observation from a distance. It is especially directed at having a composition which will not interfere with observing elements of key importance to exploration, e.g., O, H, C. The particular pyrotechnic adapted for this use in a combination of a chlorine trifluoride and a finely divided metal which has a high heat of formation with chlorine and fluorine. Chlorine trifluoride provides an unusual combination of properties for the pyrotechnic in that it produces a high energy output upon reaction and also produces a stable pyrotechnic under storage conditions by the formation of a protective fluoride film with many metals.

The inventive pyrotechnic comprises chlorine trifluoride and a finely divided metal having a high heat of formation with chlorine and fluorine. Usually the combination is in the form of a physical mixture although other combinations may be utilized such as one in which the chlorine trifluoride and finely divided metal are separated by a membrane which can be easily broken during impact on a surface.

Chlorine trifluoride is known and available from the Allied Chemical and Dye Corporation. The metal is characterized as having high heat formation with chlorine and fluorine. Normally these metals include aluminum, magnesium, zirconium, beryllium and the like and preferably aluminum since it is inexpensive, easy to fabricate and produces especially good results as a reactant. Preferably, the metal is in a finely divided form, preferably having one dimension or more less than 1 mil, to produce the high reaction rates required for the combination of high temperature and high light output from the flare. Suitable forms are fine powder, fine wire, shredded foil, wool, and the like, with wool being preferred because less separation of the physical mixture occurs.

When an especially high temperature is preferred, the chlorine trifluoride and metal are used in a stoichiometric ratio. When an increase in light output is required, an excess of metal may be utilized although some sacrifice in the temperature occurs. Normally the excess is in the order of 10 equivalent percent.

In addition to its excellent properties of high temperature and high light output, the pyrotechnic provides additional advantages of being stable under ordinary conditions of storage. Flare packages, in which the pyrotechnic is contained in a metallic housing, are stable up to temperatures in the order of 150° F. and stable under vibration tests and 8-ft. drop tests. The metallic housing is made from a metal which forms a protective fluoride film which is not soluble in the trifluoride. Such metals include aluminum, copper, brass, magnesium, and many of the stainless steels. Aluminum is preferred since it is inexpensive, easy to fabricate and light weight.

As mentioned above, a major advantage of the pyrotechnic comprising the combination of chlorine trifluoride and aluminum is that its spectra does not interfere with the spectra of the important elements, such as oxygen, carbon and iron, commonly present either in free or combined form on the surface of the earth and expected to be present on the lunar surface. When the aluminum content of the particular surface is being investigated, a pyrotechnic from another of the suitable metals can be utilized.

Performance of the pyrotechnic is considered very satisfactory. Combinations of chlorine trifluoride and aluminum have produced temperatures up to 4000° C. and $1.23 \times 10^6$ lumen secs. with a peak of $13.6 \times 10^7$ lumens based on approximately 50 gms. of pyrotechnic. In addition, the pyrotechnic has also been ignited successfully under vacuum conditions and impact conditions.

Therefore, the pyrotechnic is usable in a method of analyzing the chemical composition of solid material in remote areas from a distance, which method comprises igniting the pyrotechnic described above in the presence of the solid material to produce a high temperature illuminating light signal with spectra characteristic of the composition of the solid material, receiving the light signal at a distance from the ignition, and analyzing the spectra from the light signal to determine at least some of the components of said solid material.

The following examples illustrate some embodiments of this invention. It is to be understood that these are for illustrative purposes only and do not purport to be wholly definitive with respect to conditions or scope.

Example I

A pyrotechnic composed of chlorine trifluoride and aluminum was ignited by impact. The pyrotechnic was prepared by placing 15–20 g. of chlorine trifluoride in a glass test tube which was surrounded by an excess of aluminum powder (about 150 g.). The powder was contained in an aluminum foil cup and separated from the glass test tube by an aluminum foil test tube.

After dark, a bullet from a .22 caliber rifle was fired at the chlorine trifluoride-aluminum target and upon impact of the rifle bullet, an intense white fireball estimated at 2–3 ft. in diameter was formed. The test demonstrated that the pyrotechnic could be ignited by impact.

Example II

The effect of burial in soil on light output from an ignited pyrotechnic was determined. In the test, the pyrotechnic was composed of a mixture (approximately stoichiometric) of about 37.1 g. of chlorine trifluoride and about 14.1 g. of aluminum foil. The pyrotechnic was enclosed in a small aluminum canister, which weighed about 9.7 g., to form a flare package. The canister was then buried to a depth equal to approximately its diameter in crushed granite rock and the pyrotechnic was ignited electrically.

A temperature of over 3660° C. and a light peak of about $15.6 \times 10^7$ lumens were produced by the flare. The light yield from the flare was about $0.47 \times 10^6$ lumen secs. Inspection of the exposed crushed rock showed it to be heavily attacked. Spectrograms taken during the test showed excellent soil involvement lines which demonstrated that temperatures had been reached to produce spectra which could be used for analysis purposes.

I claim:
1. A method of producing a flame suitable for analyzing the chemical composition of solid material, which method comprises:
   positioning an impact ignitable pyrotechnic composed of chlorine-trifluoride and a finely divided metal having a high heat of formation with chlorine and fluorine, in the presence of said solid material, igniting said chemically stable pyrotechnic by impact to produce a high temperature illuminating light signal with spectra characteristics of the composition of said material.

References Cited

UNITED STATES PATENTS 2,252,508  8/1941  Hoff.
3,088,808  5/1963  Mandell.

JEWELL H. PEDERSEN, *Primary Examiner.*

B. J. LACOMIS, *Assistant Examiner.*